United States Patent [19]

Brook et al.

[11] Patent Number: 5,341,670

[45] Date of Patent: Aug. 30, 1994

[54] METHOD AND APPARATUS FOR LOCATING SEEPAGE FROM TANKS

[75] Inventors: Robert A. Brook, Richardson; Gary A. Crews, Plano, both of Tex.; Susan M. Perrell, Seal Beach, Calif.

[73] Assignee: Atlantic Richfield Company, Los Angeles, Calif.

[21] Appl. No.: 42,905

[22] Filed: Apr. 5, 1993

Related U.S. Application Data

[63] Continuation of Ser. No. 807,539, Dec. 13, 1991, abandoned.

[51] Int. Cl.$^5$ ............................................. G01M 3/24
[52] U.S. Cl. ..................................... 73/40.5 A; 73/592
[58] Field of Search ................ 73/40.5 A, 592, 587, 73/49.2 T; 367/125; 376/252

[56] References Cited

U.S. PATENT DOCUMENTS

| | | | |
|---|---|---|---|
| 3,838,593 | 10/1974 | Thompson | 73/40.5 A |
| 4,006,625 | 2/1977 | Davis | 73/587 |
| 4,009,463 | 2/1977 | Vercellotti et al. | 73/587 |
| 4,033,179 | 7/1977 | Romrell | 73/587 |
| 4,416,145 | 11/1983 | Goodman et al. | 73/592 |
| 4,428,236 | 1/1984 | Votava et al. | 73/587 |
| 4,858,462 | 8/1989 | Coulter et al. | 73/40.5 A |
| 4,958,296 | 9/1990 | Saitoh et al. | 73/592 |
| 5,038,614 | 8/1991 | Bseisu et al. | 376/252 |
| 5,058,419 | 10/1991 | Nordstrom et al. | 73/40.5 A |
| 5,231,866 | 8/1993 | Peacock | 73/40.5 A |

*Primary Examiner*—Hezron E. Williams
*Assistant Examiner*—Nashmiya N. Ashraf
*Attorney, Agent, or Firm*—Joseph E. Rogers

[57] ABSTRACT

A method for locating leak from a tank containing a fluid using acoustic signals by adaptively correlating the phase of the acoustic signals to determine a first set of possible leak locations and subsequently correlating acoustic signals from a second set of locations on the tank to determine a second set of possible leak locations and converging the first and second set of possible leak locations to determine the location of the leak.

21 Claims, 2 Drawing Sheets

METHOD AND APPARATUS FOR LOCATING SEEPAGE FROM TANKS

This application is a continuation of application Ser. No. 07/807,539 filed Dec. 13, 1991, now abandoned.

FIELD OF THE INVENTION

This invention relates to the use of acoustic signals to locate leaks from fluid containing tanks.

BACKGROUND OF THE INVENTION

Above ground tanks are used extensively for storage of many types of fluids. Among those are storage applications for a range of fluids in the oil and gas industry. Many of these tanks are in excess of 50 years old and corrosion, outdated construction techniques and structural problems result in leaks which may not be easily detectable and are very difficult to locate.

Leaks in the side of tanks are clearly visible, thus, easily detectable and locatable. Large leaks in the bottom of tanks, while possibly not visible, can be detected by measuring the change of the volume of oil in the tank. For example, leaks on the order of 100 gallons per hour can be detected by measuring the volume change over a 24 hour period.

Small leaks through the bottom of tanks cannot be easily detected. Oil does not always seep at or to the edges of such tanks, but moves directly into the ground and may migrate vertically downwards thus leaving no visual indication of such a leak. Furthermore, volumetric changes due to such small leaks are not generally detectable because they are masked by small volumetric changes which occur due to external temperature changes and planned input to and output from such tanks during the measurement period. Therefore, leaks on the order of approximately one gallon per hour are currently undetectable and cannot be located. These small leaks represent an environmental problem as well as a significant loss in revenue.

The technology exists to repair such leaks. For example, above ground leaks can be repaired using patches or other means. Furthermore, the technology exists to repair leaks below ground level and to provide additional safeguards for the future such as using double bottom systems to ensure that if a leak does occur it is detectable and that the oil does not contaminate the ground. However, the below ground technology is expensive and a complete upgrade of all tanks will take the industry several years to accomplish. Therefore, a method is required to identify the problem tanks so that they can be given priority.

Past work in this area has found that such leaks continuously generate a very low level acoustic signal. Calculations indicate that energy release is on the order of 0.5 watts. The signals have a general pattern and are fixed in location because they emanate from the leak. Current methods try to use directional listening devices, and location determination by methods of crossed bearings or triangulation. These methods require that the emission signal be larger than the background noise. This is seldom true, requiring long listening times to gain a statistically significant number of estimates. Many of the larger energy arrivals come from outside of the tank requiring methods to discriminate against false positions. Relying on the larger signal events for location makes the existing methods very susceptible to multipathing and reflections within these very complex structures. Further compounding the problems of direct event location is the large amount of information. With sample rates on the order of 50,000 samples per second, on the order of 20 gigabytes would need to be recorded for one channel in post processing of a 24 hour period.

A need still exists for an effective method and apparatus that uses basically real-time data to acoustically detect and locate small leaks in above ground storage tanks in the presence of high ambient noise generated in or outside of the tank.

SUMMARY OF THE INVENTION

According to the present invention, an effective method for locating a small leak from an above ground storage tank containing a fluid using acoustic signals is provided. The method comprises:
  (a) receiving acoustic signals at a first set of points;
  (b) determining the phase delay between the acoustic signals received at the first set of points using adaptive correlation techniques thereby defining a first arc of possible leak locations;
  (c) receiving acoustic signals at a second set of points;
  (d) determining the phase delay between the acoustic signals received at the second set of points using adaptive correlation techniques thereby defining a second arc of possible leak locations;
  (e) determining the intersection of the first and second arcs thereby locating the actual position of the leak.

DESCRIPTION OF THE PREFERRED EMBODIMENTS

In the discussion of the figures, the same numbers will be used throughout to refer to the same or similar components.

Figure 1:
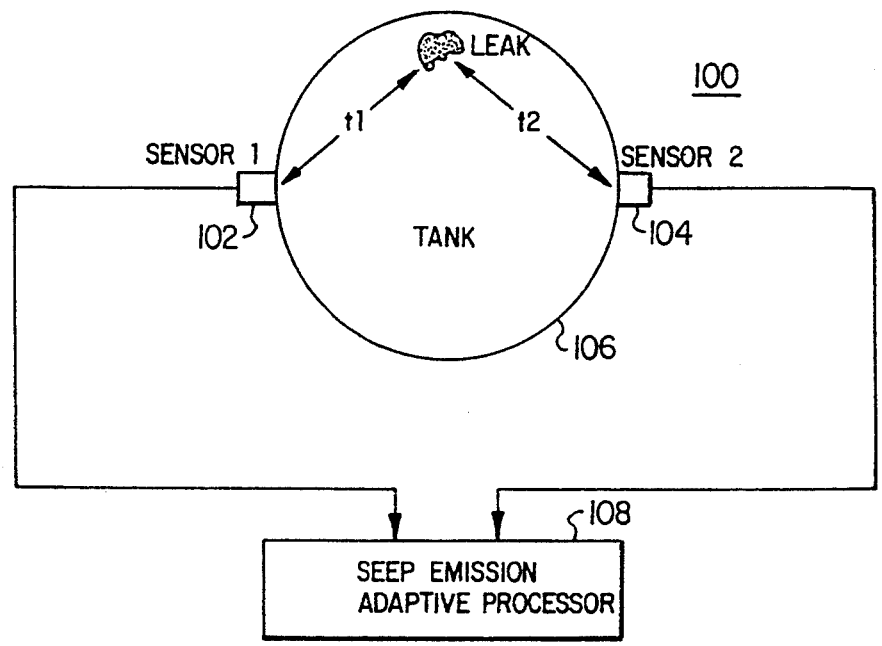
FIG. 1 is a schematic diagram showing a basic placement of components of the acoustic leak location system around the tank.

FIG. 1 is a schematic diagram showing placement of leak location system components around a tank. FIG. 1 shows a two-channel model of the field configuration for an acoustic leak location system 100 but the system is not limited to just two sensors. In this embodiment, sensors 102 and 104 are positioned on the circumference of tank 106 and are suitably mounted to allow receipt of acoustic signals in the tank and fluid. Sensors 102 and 104 could be, for example, high sensitivity accelerometers with a wide bandwidth response capable of producing an electrical signal corresponding to acoustic signals existing at the point of attachment to the tank 106. Such sensors are well known in the art.

Figure 2:
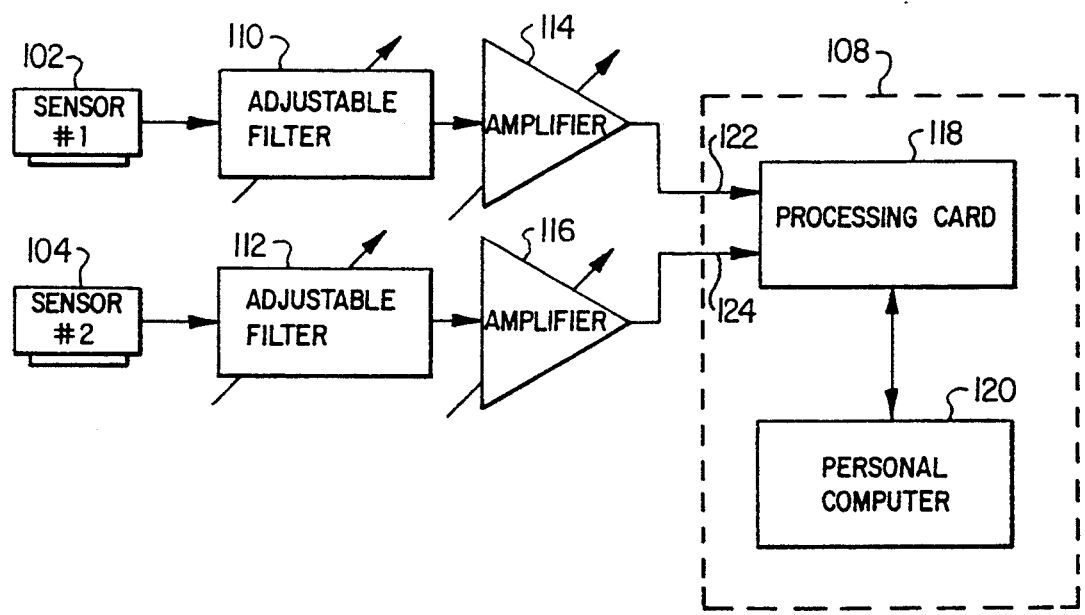
FIG. 2 shows a block diagram of a sensor input circuit to the processing card.

Sensors 102 and 104 are in electronic communication with the seep emission adaptive processor 108. FIG. 2 shows a schematic block diagram of a possible conditioning circuit for conditioning the input to seep emission adaptive processor 108. The outputs from sensors 102 and 104 are in electronic communication with adjustable filters 110 and 112 respectively. The filtered outputs from filters 110 and 112 are electronically communicated to amplifiers 114 and 116, respectively.

The outputs from amplifiers 114 and 116 are in electronic communication with processing card 118 through processing card 118 input terminals 122 and 124. Processor 108 includes a processing card 118 which is in electronic communication with personal computer 120.

Figure 3:
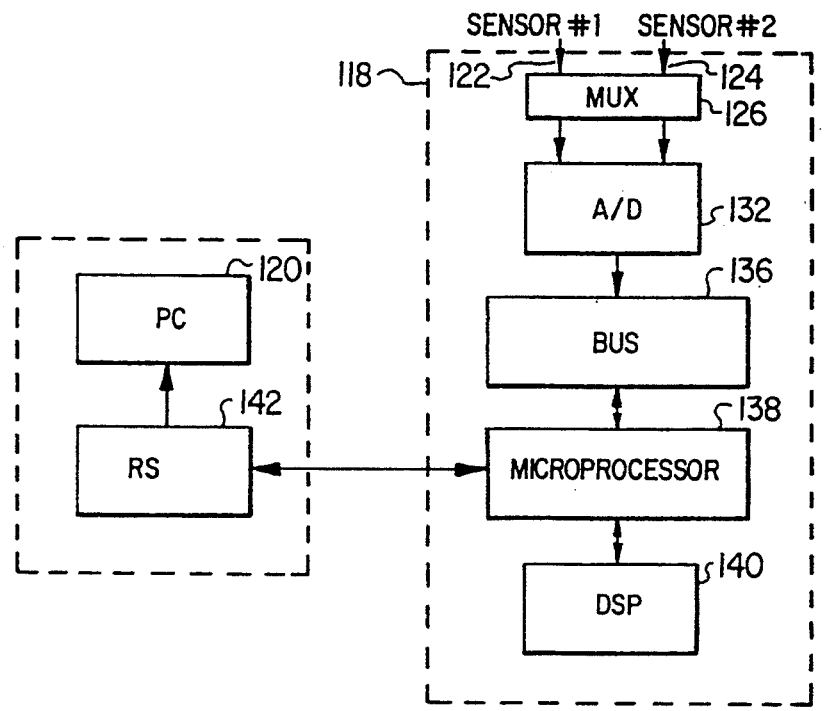
FIG. 3 shows a schematic block diagram of the processing architecture.

FIG. 3 shows a block diagram of the seep emission adaptive processor 108. The architecture for processor 118 is shown. Input to processor 118 is at terminals 122 and 124. Terminals 122 and 124 are in electronic communication with high speed multiplexer 126, which is well known in the art. High speed multiplexer 126 is in electronic communication with an analog to digital converter 132. Converter 132 samples the analog data at a rate suitable for the given frequencies of interest. For example, a typical sample rate might be on the order of 50 khz for each channel. Analog to digital converter 132 can be any one of a number of circuits which are well known in the art. Converter 132 should be of the highest precision available at the sample rate to enable the detection of weak signals in the presence of large noise.

Converter 132 is in electronic communication with digital bus 136. Digital bus 136 is in electronic communication with converter 132. Digital bus 136 is in electronic communication with microprocessor 138. Microprocessor 138 is in electronic communication with digital signal processor 140 and personal computer 120. Digital signal processor 140 can be an adaptive correlation processor which can be any one of a number of digital signal processors which include an algorithm to perform an adaptive correlation of the acoustic signals present at sensors 102 and 104. Personal computer 120 also has provisions for providing an indication of leak location such as an icon of tank 106 showing the calculated location of the leak.

In operation, the system uses the acoustic signals generated by the leak and adaptive correlation techniques to fix the leak location. In particular, sensors 102 and 104 detect acoustic signals present at the periphery of tank 106. The acoustic signals present will include noise at a multitude of frequencies, phase relationships, amplitudes, and not all of them will be associated with the leak. Some of the noise is ambient noise associated with sources both in and out side of tank 106. In addition, they are not all continuous nor are they fixed in location both of which are characteristic of the acoustic signatures of small leaks.

The small leaks of interest are characterized by continuously present acoustic signals which are generally above 20 khz and persist so long as there is a leak. The acoustic signals received by sensors 102 and 104 are provided to adjustable filters 110 and 112 to reduce the amplitude of signals at frequencies other than those that are expected from such leaks (for example, frequencies less than 20 Khz). Amplifiers 114 and 116 raise the amplitude of the signal, thereby increasing the signal to electronic noise ratio. Amplifiers 114 and 116 also raise the voltage level of the signal to a level suitable for processing the seep emission adaptive processor 108.

After amplification, the analog acoustic signals are multiplexed by the multiplexer 126 to allow the use of only one analog to digital converter, a common practice in the art. The analog to digital converter transforms the analog acoustic signals into digital data at a rate suitable for signals in the frequency range of interest as is well known in the art.

The single digital data stream containing the information from both acoustic sensors is provided to microprocessor 138 via bus 136 in a manner common to the art. Microprocessor 138 acts as a buffer between bus 136 and digital signal processor 140 and as a communication controller between the signal processor 140 and the personal computer 120. Microprocessor 138 also transforms the data from the a/d converter into two separate streams in a format acceptable to the signal processor.

Multiplexer 126 provides a multiplexed analog acoustic signal to analog to digital converter 132. Converter 132 transforms the multiplexed analog acoustic signal of multiplexer 126 to a single digital signal.

Digital signal processor 140 uses an adaptive correlation algorithm to determine a time difference between the time of receipt at sensor 102 and the time of receipt at sensor 104. The digital signal processor 140 continuously updates approximately 300 correlation points as the acoustic signals are received through sensors 102 and 104. Processor 140 compares the received acoustic signal waveform received at sensor 102 to the waveform received at sensor 104. When processor 140 determines that the waveform received at sensor 102 is substantially the same as the waveform received at sensor 104 it uses an adaptive correlation algorithm to determine the difference in time of receipt at sensor 102 versus the time of receipt at sensor 104.

Any one of several adaptive correlation algorithms can be applied in processor 140, for example, the LMS adaptive filter of Widrow which is well known in the art can be used. The algorithm also uses a first scalar which dictates the rate at which processor 140 will converge to the correct solution. Small values of this first scalar lengthen the time to correlate the signals and converge on a time difference, but they help to discriminate against larger but inconsistent ambient noises which are uncharacteristic of small leaks. A second scalar is used as a memory or energy decay term. This helps the algorithm ignore short, high energy noise bursts that are not persistent and thus not related to the acoustic signal generated by the leak. Thereby, also helping to eliminate ambient noises of high amplitude which are uncharacteristic of small leaks and may contain the false positions caused by multipaths and reflections within the tank.

The time difference is calculated by comparing the digitized signals at approximately 300 correlation points as the acoustic signals are received through sensors 102 and 104. The updated correlations are transmitted to personal computer 120 through a standard RS232 port from processor 140 through microprocessor 138. The PC displays the current correlation. After a period of convergence, the displayed correlation indicates the difference in time of receipt at sensor 102 versus the time of receipt at sensor 104. The time difference is stored in computer 120.

Sensors 102 and 104 are then moved to a second location on the periphery of tank 106 and the correlation process described above is performed again. A second time difference is developed and stored in computer 120.

Personal computer 120 compares the first and second time differences and makes a logical determination of the location of the leak. Since the acoustic signal generated by the leak as received at sensors 102 and 104 are generated at the same time, and the medium through which the signal passes and acoustic velocity are the same, any difference in time of receipt at sensors 102 and 104 is substantially due to a differential distance from sensor 102 to the leak as compared to the distance from sensor 104 to the leak.

Figure 4A:
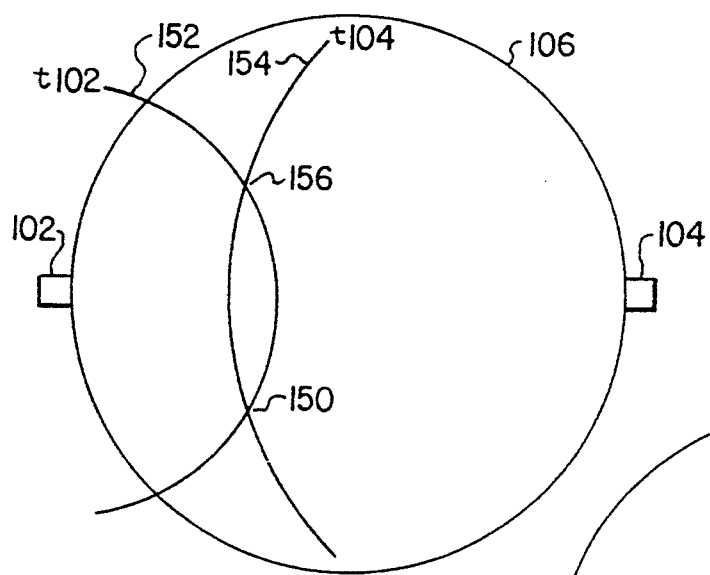
FIGS. 4a and 4b are illustrations of the method of logical determination of leak location.

This logical determination is illustrated on FIG. 4a and b. In FIG. 4(a), the leak 150 is shown as an X on the bottom of tank 106. Sensors 102 and 104 are shown at a set of first locations. While they are shown 180 degrees apart, it is not necessary that they be located exactly at those locations. Arc 152 corresponds to a set of possible leak locations which are along an arc of equal time of travel from the leak to sensor 102. Arc 154 corresponds to a set of possible leak locations on an arc of equal time of travel to sensor 104.

Since the leak location is not known from the first estimate and only the difference between the leak and the detectors is known the leak location is constrained to possible points 150 and 156 since these points lie both on arc 152 and 154. Thus, it is ambiguous as to leak location since the time difference could yield two locations 156 or 150.

Figure 4B:
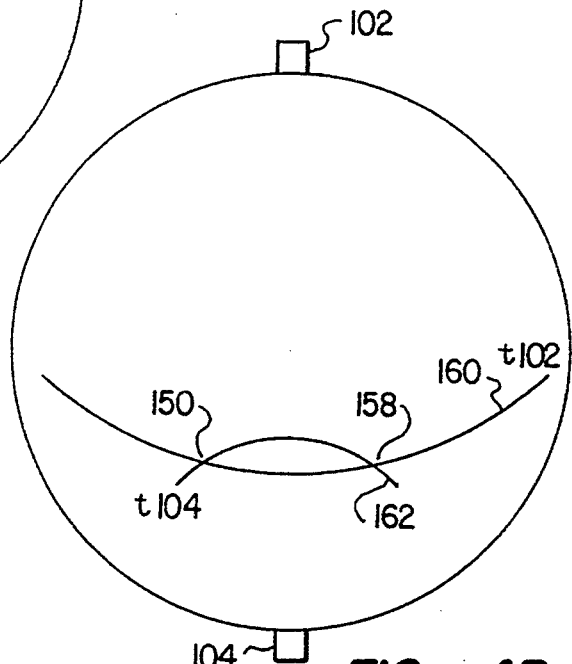

As described above, personal computer 120 stores this first time difference and the possible leak locations 150 and 156. Sensors 102 and 104 are moved to new locations as shown in FIG. 4(b). A second correlation is performed. Similarly, equal time path 160 corresponds to possible leak locations along an arc time of travel from the leak to sensor 102 and arc 162 corresponds to possible leak locations along an arc of equal time of travel from the leak to sensor 104. Once again the time differences yield an arc of potential leak positions 150 and 158. Personal computer 120 then compares the time differences and of points 150, 156, and 158. The only point which is common to both sets of data is leak location 150. Therefore, personal computer 120 determines the actual leak to be at the 150 location.

Other variations are possible, including the use of signals from pressure phones submerged in the oil tank as sensors 102 and 104 or comparing pressure phones inside the tank to sensors outside the tank. In addition, other possible adaptive correlation algorithms are usable including conventional correlation techniques or adaptive time estimators. While electrical connection is shown, any method of providing sensor signals to the processor can be used including but not limited to radio frequency transmission and fibre optic links.

Thus, this invention has the following advantages:

1. Measurement of a large volume of data over an unlimited period of time thereby exploiting the statistical continuity of the leaks acoustic emissions in order to extract a measurable signature from other ambient noise.
2. Uses an adaptive correlation technique with only sufficient points to converge on noises originating from within the tank thereby excluding high amplitude ambient noises of short duration outside the sphere of interest.
3. Apply adaptive algorithms with controllable convergence rates to distinguish between non-stationary noise sources commonly present in oil facilities including motor vehicles, trains, or machinery operating on time switches and the leak of interest.
4. Uses multiple measurements (either simultaneously or individually) to triangulate to an approximate location of the leak or leaks.

Having thus described the invention by reference to certain of its preferred embodiments, it is respectfully pointed out that the embodiments described are illustrative rather than limiting and that many variations and modifications are possible within the scope of the present invention. Many such variations and modifications may appear obvious and desirable to those skilled in the art based on the foregoing description of the preferred embodiments.

Having thus described the invention, we claim:

1. A method for locating a leak from a tank containing a fluid using a broad frequency spectrum of acoustic signals, comprising:
   (a) receiving a broad frequency spectrum of acoustic signals at a first plurality of points;
   (b) reducing the amplitudes of low frequency portions of the broad frequency spectrum of acoustic signals received at the first plurality of points;
   (c) continuously correlating the phases of high frequency portions of the acoustic signals using an adaptive correlation algorithm;
   (d) determining a first difference in times of receipt of the high frequency portions of the acoustic signals at each of the first plurality of points to determine a first plurality of possible leak locations;
   (e) receiving a broad frequency spectrum of acoustic signals at a second plurality of points;
   (f) reducing the amplitudes of low frequency portions of the broad frequency spectrum of acoustic signals received at the second plurality of points;
   (g) correlating the phases of high frequency portions of the acoustic signals to determine a second plurality of possible leak locations; and
   (h) correlating the first and second plurality of possible leak locations to ascertain leak location.

2. The method of claim 1 wherein reducing steps reduce the amplitudes of acoustic signals of less than 20 Khz.

3. The method of claim 1 further comprising calculating a first plurality of radial distances to the leak for each of the first plurality of points using the first difference in times of receipt at each of the first plurality of points and acoustic velocity of the tank and fluid.

4. The method of claim 3 further comprising converging the first plurality of radial distances to determine the first plurality of possible leak locations.

5. The method of claim 4 further comprising determining a second difference in times of receipt of the acoustic signals at each of the second plurality of points.

6. The method of claim 5 further comprising calculating a second plurality of radial distances to the leak for each of the second plurality of points using the second difference in times of receipt at each of the second plurality of points and acoustic velocity within the tank and fluid.

7. The method of claim 6 further comprising converging the second plurality of radial distances to determine the second plurality of possible leak locations.

8. The method of claim 7 further comprising converging the first and second pluralities of possible leak locations to determine leak location.

9. An apparatus for determining the location of a leak from the bottom of a tank containing a fluid using a spectrum of high frequency acoustic signals generated by the leak, comprising:
   (a) a digital signal processor for discriminating against large inconsistent ambient noise and high energy noise bursts and for determining time differences between the times of receipt of high frequency acoustic signals at a plurality of sensors;

(b) an adjustable filter in electrical communication with said digital signal processor for reducing the amplitudes of low frequency acoustic signals;

(c) a plurality of sensors at a plurality of locations on the periphery of the tank in electronic communication with said digital signal processor for detecting the acoustic signals thereby allowing determination of a plurality of differences between times of receipt of the acoustic signals at each of the plurality of sensors;

(d) a computing device in electronic communication with said digital signal processor for comparing the differences in times of receipt and determining possible leak locations.

10. The apparatus of claim 9 wherein the digital signal processor is an adaptive correlation processor.

11. The apparatus of claim 9, wherein the filter reduces the amplitudes of acoustic signals whose frequency is less than 20 Khz.

12. A method for locating a leak from a tank containing a fluid using a broad frequency spectrum of acoustic signals, comprising:

(a) receiving a broad frequency spectrum of acoustic signals at a first plurality of points;

(b) correlating the phases of the spectrum of acoustic signals;

(c) determining a first difference in times of receipt of the acoustic signals at each of the first plurality of points to determine a first plurality of possible leak locations;

(d) receiving a broad frequency spectrum of acoustic signals at a second plurality of points;

(e) continuously correlating the phases of the spectrum of acoustic signals using an adaptive correlation algorithm to determine a second plurality of possible leak locations; and (f) correlating the first and second plurality of possible leak locations to ascertain leak location.

13. The method of claim 12 further comprising calculating a first plurality of radial distances to possible leak locations for each of the first plurality of points using the first difference in times of receipt of acoustic signals at each of the first plurality of points and acoustic velocity within the tank and fluid.

14. The method of claim 13 further comprising converging the first plurality of radial distances to determine the first plurality of possible leak locations.

15. The method of claim 14 further comprising determining a second difference in times of receipt of the acoustic signals at each of the second plurality of points.

16. The method of claim 15 further comprising calculating a second plurality of radial distances to possible leak locations for each of the second plurality of points using the second difference in times of receipt of acoustic signals at each of the second plurality of points and acoustic velocity within the tank and fluid.

17. The method of claim 16 further comprising converging the second plurality of radial distances to determine the second plurality of possible leak locations.

18. The method of claim 17 further comprising converging the first and second pluralities of possible leak locations to determine leak location.

19. An apparatus for determining the location of a leak from the bottom of a tank containing a fluid using a spectrum of acoustic signals generated by the leak, comprising:

(a) a digital signal processor for discriminating against large inconsistent ambient noise and high energy noise bursts and for determining time differences between the times of receipt at a plurality of sensors;

(b) a plurality of sensors at a plurality of locations on the periphery of the tank in electronic communication with said digital signal processor for detecting the acoustic signals thereby allowing determination of a plurality of differences between times of receipt of the acoustic signal at each of the plurality of sensors;

(c) a computing device in electronic communication with said digital signal processor for comparing the differences in times of receipt and determining possible leak locations.

20. The apparatus of claim 19 wherein the digital signal processor is an adaptive correlation processor.

21. The apparatus of claim 19 further including a filter capable of reducing the amplitude of acoustic signals whose frequency is less than 20 Khz.

* * * * *